United States Patent [19]
Jabbarai et al.

[11] Patent Number: 5,337,202
[45] Date of Patent: Aug. 9, 1994

[54] ACTUATOR ARM ASSEMBLY PRINTED CIRCUIT CABLE TO EXTERNAL PRINTED CIRCUIT BOARD INTERFACE APPARATUS

[75] Inventors: Iraj Jabbarai; Brian L. Phillips, both of Santa Clara County, Calif.

[73] Assignee: Seagate Technology, Inc., Scotts Valley, Calif.

[21] Appl. No.: 41,880

[22] Filed: Apr. 2, 1993

Related U.S. Application Data

[63] Continuation of Ser. No. 611,189, Nov. 9, 1990, abandoned.

[51] Int. Cl.⁵ .................. G11B 5/55; G11B 21/08; H01R 9/09; H01R 13/52
[52] U.S. Cl. .................. 360/97.01; 360/106; 360/108; 439/67; 439/77; 439/271; 439/493
[58] Field of Search .................. 360/97.01–97.04, 360/104, 98.01, 104, 105, 137; 439/49, 65, 76–79, 82, 271–278, 283, 519, 82

[56] References Cited

U.S. PATENT DOCUMENTS

| | | | |
|---|---|---|---|
| 4,626,055 | 12/1986 | Baker et al. | 439/278 |
| 4,639,863 | 1/1987 | Harrison et al. | 360/97.01 |
| 4,846,698 | 7/1989 | Staiger et al. | 439/271 |
| 4,923,406 | 5/1990 | Bucknam | 361/398 |
| 4,933,785 | 6/1990 | Morehouse et al. | 360/78.04 |
| 4,950,170 | 8/1990 | Miller, Jr. | 439/82 |
| 4,965,684 | 10/1990 | Stefansky | 360/97.01 |
| 5,025,335 | 6/1991 | Stefansky | 360/97.01 |
| 5,095,396 | 3/1992 | Putnam et al. | 360/97.01 |
| 5,109,310 | 4/1992 | Ohkjita et al. | 360/97.01 |
| 5,170,300 | 12/1992 | Stefansky | 360/97.01 |

*Primary Examiner*—A. J. Heinz
*Assistant Examiner*—Jefferson Evans
*Attorney, Agent, or Firm*—Flehr, Hohbach, Test, Albritton & Herbert

[57] ABSTRACT

The present invention is apparatus for interfacing the actuator arm assembly to control and signal processing circuits mounted external to the disc drive casing. The invention provides a sealed connective interface which protects the integrity of the "clean room" environment in which selected disc drive components function.

4 Claims, 3 Drawing Sheets

ACTUATOR ARM ASSEMBLY PRINTED CIRCUIT CABLE TO EXTERNAL PRINTED CIRCUIT BOARD INTERFACE APPARATUS

This is a continuation of application Ser. No. 07/611,189 filed Nov. 9, 1990, abandoned.

The present invention relates generally to disc drive systems and particularly to apparatus for interfacing the actuator arm assembly of a disc drive to control and signal processing circuits mounted external to the disc drive casing.

BACKGROUND OF THE INVENTION

The present invention is apparatus for interfacing the actuator arm assembly in a disc drive to control and signal processing circuits mounted external to the disc drive casing. Additionally, the inventive apparatus protects the integrity of the "clean room" environment surrounding selected disc drive components.

In general, a disc drive contains one or more discs capable of magnetically storing information. The discs are rotated by a spindle motor mounted at the center of the disc or discs. The information is read and written to specific locations on the disc or discs using magnetic transducers, commonly known as heads, that "fly" above the disc surface. Head positioning apparatus is provided in the form of an actuator arm assembly.

The actuator arm assembly consists of a substantially triangularly shaped actuator arm. Traditionally the arm is constructed from a low mass material such as cast aluminum. The arm is designed to pivot about a centrally located pivot bore. The bore cooperates with a bearing system surrounding a fixed shaft enabling the arm to pivot smoothly about the shaft.

At one end of the arm is attached a means for moving the arm about the shaft. Typically, the motion is accomplished by a moving coil magnetic motor having the motor coil attached to the arm. Activating the motor coil causes the actuator arm to pivot about the shaft.

Attached at the other end of the arm are transducers for receiving and depositing information to/from the discs. The transducers are commonly known as read/write heads. The electrical signals received by the heads are transmitted via flexible printed circuit cabling (PCC) to a signal processing circuitry located elsewhere in the disc drive. Typically, the signals from the heads are preamplified as near to the heads as physically possible. Thus, preamplification is usually provided prior to sending the signals to other signal processing circuits. To maintain a small disc drive footprint, the control signals carried by the PCC for the voice coil motor and the electrical signals sent to and received by the heads are processed outside of the casing which surrounds the previously discussed disc drive components. The casing maintains a "clean room" environment about the disc drive components.

In previous disc drive designs, the printed circuit cable (PCC) exits the casing through a slot. This design is described in U.S. Pat. No. 4, 933,785. However, a slotted casing design does not protect the integrity of the "clean room" environment surrounding the disc drive components. Even if a rubber gasket or other sealant were placed about the slot, the chances leakage in the future is significant.

An object of the present invention is to provide apparatus for interfacing the printed circuit cable with the externally mounted control and signal processing circuits which protects the integrity of the "clean room" environment.

Another objective is to provide a simplified disc drive construction, wherein the cabling does not protrude from the drive. The inventive apparatus provides a sealed connector interface between the disc drive internal components and the external control and signal processing circuits.

SUMMARY OF THE INVENTION

In summary, the present invention is apparatus for interfacing the actuator arm assembly to control and signal processing circuits mounted external to the disc drive casing. The invention provides a sealed connective interface which protects the integrity of the "clean room" environment in which selected disc drive components function.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
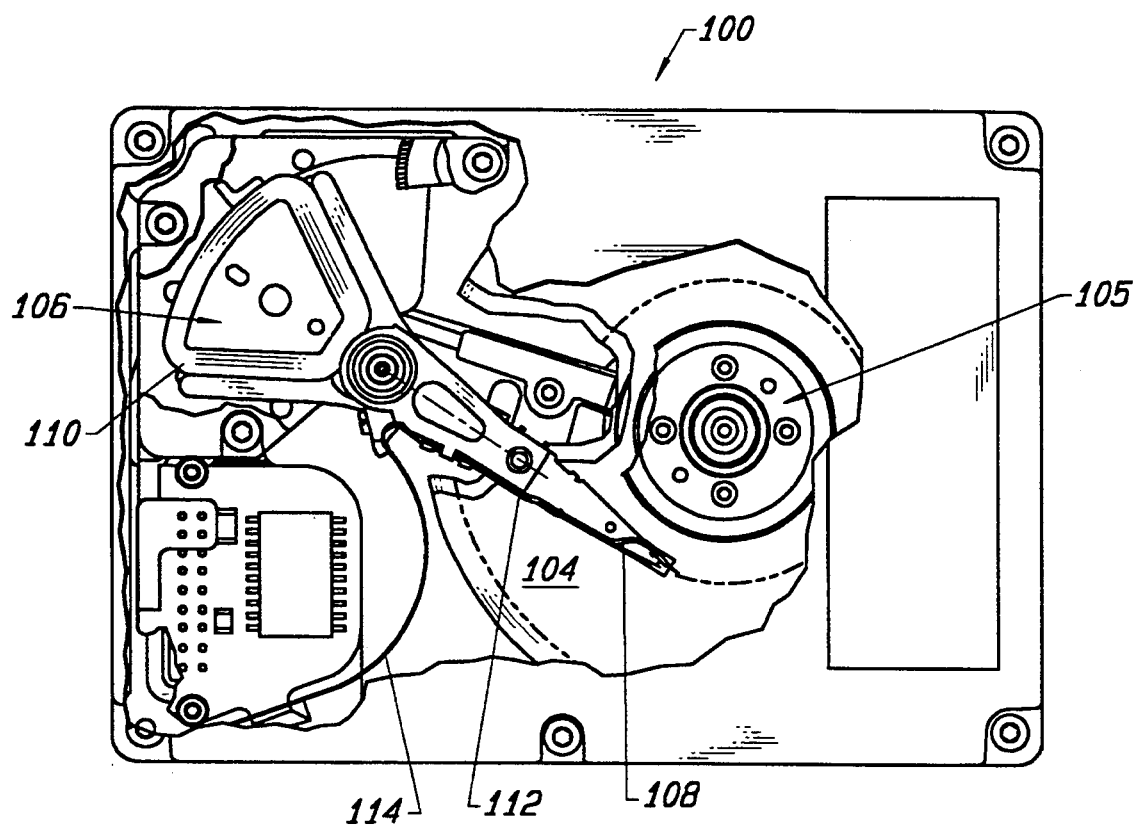
FIG. 1 is a cut-away view of a disc drive incorporating the preferred embodiment of the present invention.

Referring to FIG. 1, there is shown a cut-away view of a disc drive incorporating the preferred embodiment of the present invention. In the main, the depicted disc drive 100 includes the same basic components and operates in the same manner as was previously described in the foregoing BACKGROUND section. In summary, a casing 102 surrounds the disc 104 and the centrally located spindle motor 105. Also within casing 102 is the actuator arm assembly 106 having a read/write head assembly 108 mounted at one end and at the other end is the actuator motor 110 for moving the heads to the desired location over the disc 104.

Thin wires 112 are attached to the read/write head assembly 108. These thin wires are attached to a flexible portion of the printed circuit cable (PCC) 114 near to the actuator arm assembly's pivot point 115. The PCC arcs away from the actuator arm assembly towards a rigidly mounted portion 116 of the PCC.

Figure 2:
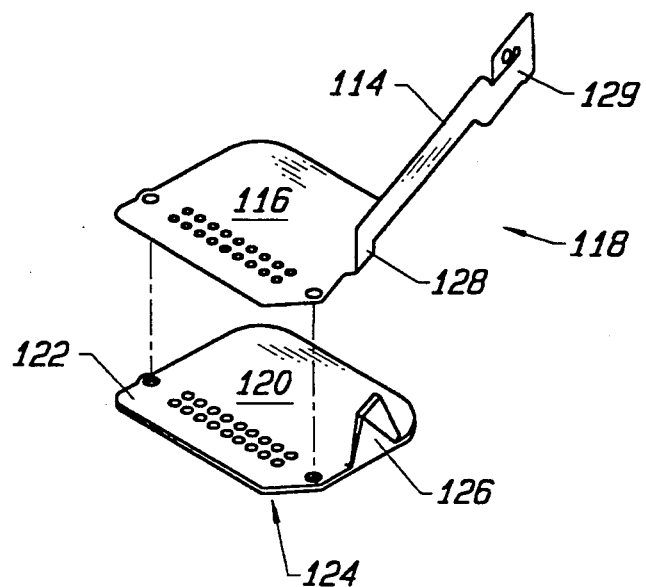
FIG. 2 is an isometric view of a printed circuit cable assembly.

FIG. 2 depicts the flexible PCC 118 having a first portion 116 which is bonded to a flat rigid member 120 and a second portion 114 which for the most part remains flexible. Note that the flat rigid member 120 has a first side 122 and a second side 124. From the first side 122 extends, in a manner which is essentially orthogonal to the plane of the first side, a flange 126. A first end 128 of the second portion 114 of the PCC 118 is bonded to the flange 126. The flange 126 directs the second portion 114 of the PCC 118 towards the actuator arm assembly 106 where the second end 129 of the second portion 114 of the PCC 118 is secured.

Figure 3A:
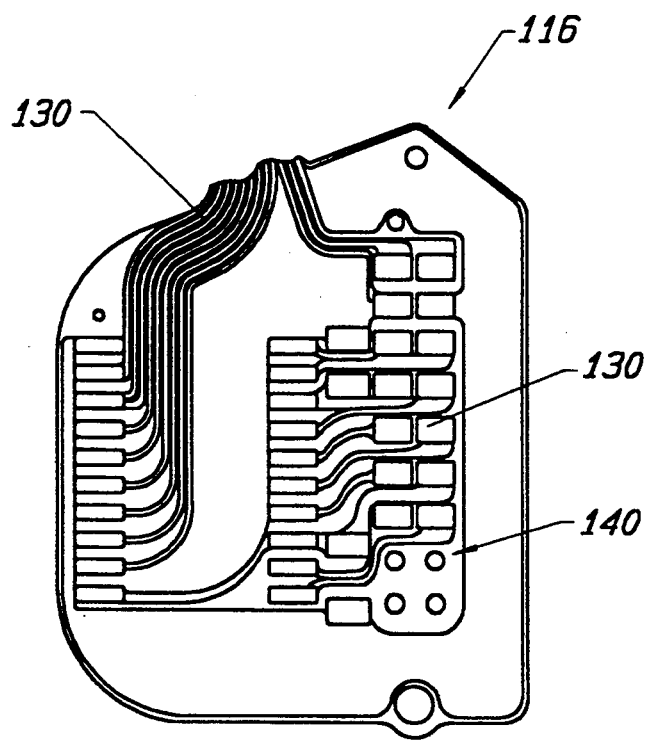
FIG. 3A is a detailed view of the conductive trace layout of the first portion of the flexible printed circuit cable.
Figure 3B:
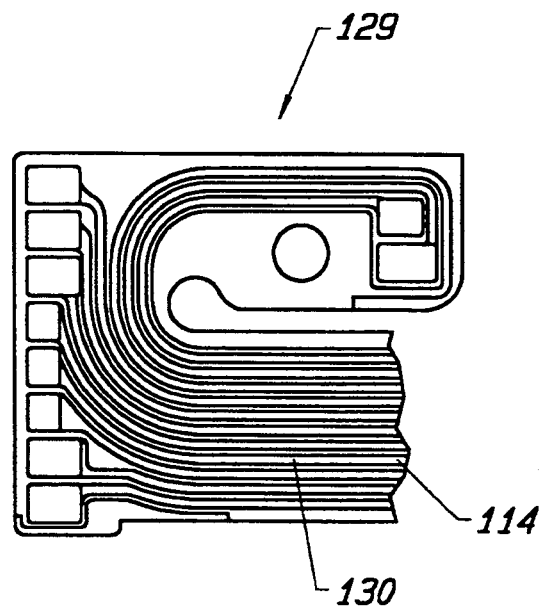
FIG. 3B is a detailed view of the conductive trace layout of the second end of the flexible portion of the flexible printed circuit cable.
Figure 4:
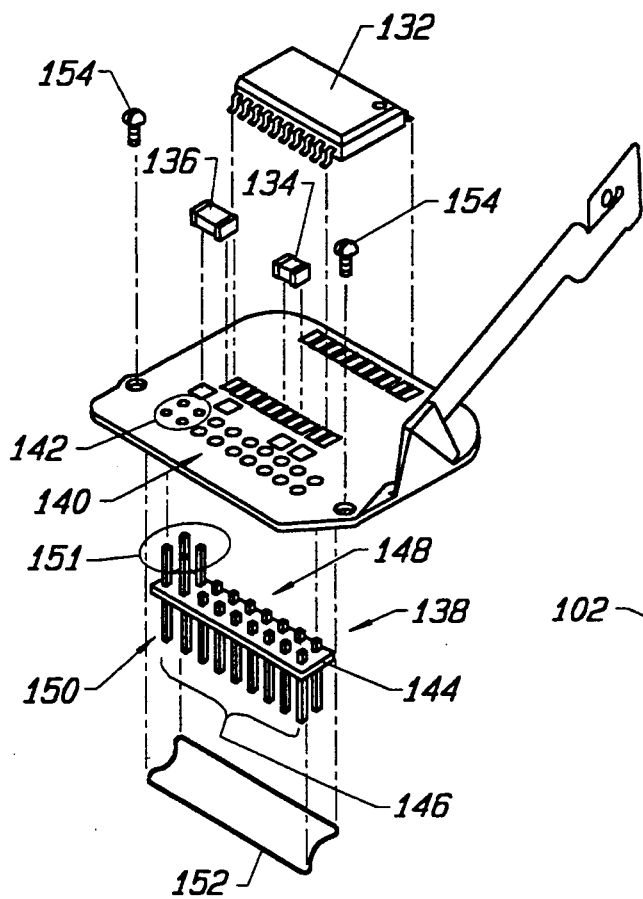
FIG. 4 is an exploded view of the preferred embodiment of the invention.

As shown in FIG. 3, PCC 118 contains a plurality of conductive traces 130 which carry the electrical signals to and from the actuator arm assembly 106. FIG. 3A shows a detailed view of the conductive traces 130 on the first portion 116 of the flexible PCC 118. The traces are patterned on the first portion 116 of the PCC 118 to accept surface mount integrated circuit components as shown in FIG. 4. FIG. 3 shows a detailed view of the second end 129 of the flexible portion 114 of the flexible PCC 118. The conductive traces 130 are patterned to interface with the thin wires 112 which are attached to the read/write head assembly 108.

As depicted in FIG. 4, the preferred embodiment includes a means for interfacing a number of the conductive traces 130 with the externally mounted control and signal processing circuits (not shown). Therein is shown a preamplifier chip 132, a surface mount resistor 134, and a surface mount capacitor 136. These components, in combination, provide preamplification for the read/write signals. The interface means takes the form of a multipin member 138 cooperating with a patterned plurality of holes 140 in the flat rigid member 120 and the first portion 116 of the PCC 118. The holes 140 are patterned to intersect a number of conductive traces. However, not all of the holes do so. Four 142 are positioned not to intersect any of the traces such that these holes 142 may be used to pass power directly to the spindle motor 105.

Multipin member 138 has a structural portion 144 which supports a plurality of conductive pins 146. The pins 146 are arranged in a pattern matching the pattern of the holes 140. The pins 146 extend through the structural portion 144 in a manner which maintains one end 148 of each pin protruding on one side of the structural member 144 and the other end 150 of each pin protruding on the other side of the structural member 144.

Figure 5:
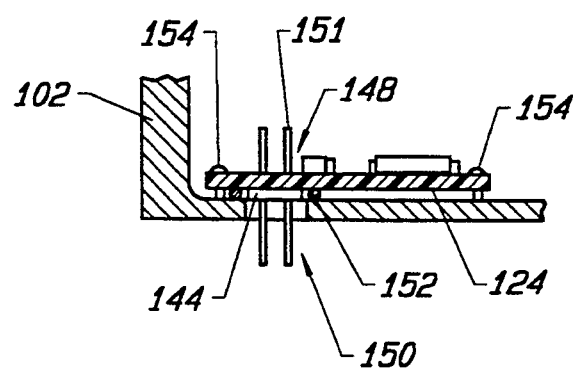
FIG. 5 is a sectional view of the apparatus depicted in FIG. 4.

End 148 of pins 146 are aligned and extended through holes 140. The pins 146 which intersect conductive traces are soldered to those traces. The pins 146 are extended though the holes 140 until the structural portion 144 abuts the second side 124 of flat rigid member 120 as shown in the sectional view of FIG. 5. End 150 of pins 146 are free to be connected to the externally mounted control and signal processing circuits. Note that the pins which do not intersect the traces 151 are significantly longer than their trace intersecting counterparts. This is to enable a spindle motor connector (not shown) to be attached to the extended pins.

The preceding arrangement enables a simple interface to be constructed, but it does not, by itself, protect the integrity of the "clean room" environment in which all of the previously discussed components are assembled. Therefore, the casing 102 must be sealed around the pins 146 and end 150 of pins 146 must extend external to casing 102. This is accomplished by a gasketing means comprising a gasket 152 oriented to surround pins 146 and be sandwiched between casing 102 and the second side of the flat rigid member 120. The forgoing assembly is mounted in place by screws 154 through mounting holes 156. The screws maintain pressure upon the gasket 152, thus maintaining the seal.

With this arrangement, the disc drive casing 102 and the components contained therein becomes a subassembly of the disc drive 100. The footprint of this portion of the drive remains small because the external circuitry can be mounted under casing 102. Attachment of the external circuitry to the externally protruding pins can be accomplished by a connector or by directly soldering the external printed circuit board to the pins.

Figure 6:
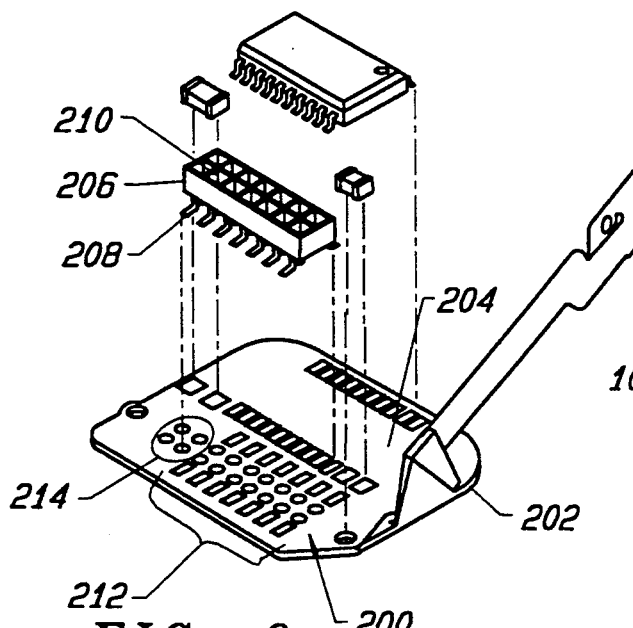
FIG. 6 is an exploded view of an alternative embodiment of the invention.
Figure 7:
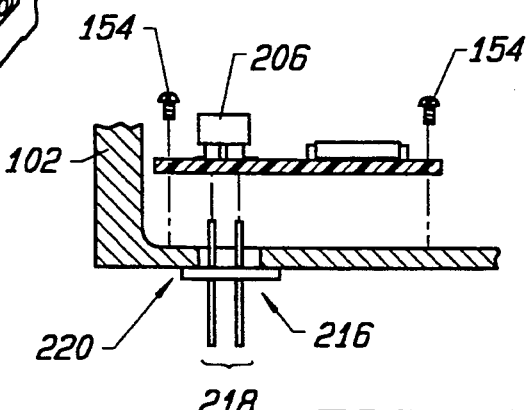
FIG. 7 is a sectional view of the apparatus depicted in FIG. 6.

FIGS. 6 and 7 show an alternative embodiment of the present invention. Herein none of the holes 200 in the flat rigid member 202 and the PCC 204 intersect the traces. Instead, a surface mount connector 206 is used to form the connective interface of the invention. The connector's conductive elements 208 attach to the traces. Each conductive element 208 forms a slot 210 into which a pin can removably be inserted. The connector 206 covers a subset of the holes shown as reference number 212. The four holes 214 used by the pins supplying power to the spindle motor remain separate and have their own connector (not shown).

In this embodiment, the multipin member 216 is fixedly attached to the casing 102 as shown in the sectional view of FIG. 7. The only difference between this multipin member 216 and the previously described member 138 is that the pins 218 are all the same length. Thus providing sufficiently long pins to interact with connector slots 210. The multipin member 216 is epoxied into position. The epoxy forms a seal 220 to protect the integrity of the "clean room" environment. This alternative embodiment is functionally equivalent to the preferred embodiment, except an additional production cost is realized by using the additional connector 206. However, some applications may require that the invention be easily removable from the casing via connector 206 and, thus, the added expense may be necessary.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

what is claimed is:

1. In a disc drive having a casing separating a spindle motor assembly, at least one disc, and an actuator arm assembly including read/write heads from externally mounted control and signal processing circuits, apparatus for electrically interfacing said actuator arm assembly to said externally mounted control and signal processing circuits comprising:

a flat rigid member having a first side and a second side and having a flange extending from and essentially orthogonal to said first side;

a flexible printed circuit cable containing a plurality of circuit traces and having a first portion designed to accept surface mount integrated circuit components and a second portion extending from said first portion and having a first end and a second end, said first portion is bonded to said first side of said flat rigid member and said first end of said second portion is bonded to said flange whereby said flange directs said second portion toward said actuator arm assembly and said second end of said second portion is attached to said actuator arm, said surface mount integrated circuit components comprising resistors, capacitors and preamplifiers for preamplification of read/write signals generated by said read/write heads;

means for electrically connecting said plurality of circuit traces to said externally mounted control and signal processing circuits, said electrically connecting means comprising a patterned plurality of holes and bonding pads terminating each of said circuit traces, a multipin interfacing member and bonding means for transmitting signals passing from said circuit traces to said externally mounted control and signal processing circuits, said holes integral to and bored through said first portion of said printed circuit cable and said flat rigid member in close proximity to said first end, said multipin interface member having a structural portion through which a plurality of conductive pins extend, one end of said conductive pins patterned to match and extend through said patterned plurality of holes until said structural portion abuts said second side of said flat rigid member and the other end of said conductive pins mate with said externally mounted control and signal processing circuits; and a gasketing means surrounding said electrically connecting means for sealing said flat rigid member to said casing.

2. The apparatus of claim 1 wherein said bonding means further includes a connector conductively attached to a number of said circuit traces at said bonding pads having a like patterned plurality of slots aligned over said patterned plurality of holes in said first portion, said slots for receiving said plurality of conductive pins, such that said connector removably attaches to said multipin member and the other end of said conductive pins is connected to said externally mounted control and signal processing circuits.

3. The apparatus of claim 1 wherein said structural portion is peripherally sealed to said casing.

4. The apparatus as in claim 1 wherein at least one of said conductive pins is connected to a spindle motor.

* * * * *